United States Patent [19]

Bertocci et al.

[11] Patent Number: 5,084,260
[45] Date of Patent: Jan. 28, 1992

[54] METHOD FOR PRODUCING PURE BORIC ACID

[75] Inventors: Paolo Bertocci; Paolo Mazzinghi, both of Pomarance, Italy

[73] Assignee: Societa Chimica Larderello S.p.A., Milan, Italy

[21] Appl. No.: 67,966

[22] Filed: Jun. 29, 1987

[30] Foreign Application Priority Data

Jul. 23, 1986 [IT] Italy ............... 21227 A/86

[51] Int. Cl.$^5$ .................. B01D 9/02; C01B 35/10
[52] U.S. Cl. ........................ 423/283; 23/296; 23/298
[58] Field of Search ............ 423/283; 23/296, 298

[56] References Cited

U.S. PATENT DOCUMENTS

| | | | |
|---|---|---|---|
| 2,969,275 | 1/1961 | Garrett | 423/283 |
| 3,336,115 | 8/1967 | Reburn et al. | 23/296 |
| 3,424,563 | 1/1969 | Grinstead | 423/276 |
| 3,493,349 | 2/1970 | Schiappa, Jr. et al. | 423/280 |
| 4,329,154 | 5/1982 | Shono et al. | 423/283 |
| 4,435,184 | 3/1984 | Schroeder et al. | 423/283 |

FOREIGN PATENT DOCUMENTS 0147350  4/1981  Fed. Rep. of Germany ...... 423/283

OTHER PUBLICATIONS

Mellor, A Comprehensive Treatise on Inorganic and Theoretical Chemistry, Longmans, Green and Co., 1946, vol. V, pp. 49–51.

*Primary Examiner*—Jeffrey E. Russel
*Attorney, Agent, or Firm*—Shea & Gould

[57] ABSTRACT

Pure boric acid is obtained by a high-yield method with a non-pollutant effluent discharge, comprising the following stages carried out in succession:

a) dissolving impure boric acid in an aqueous vehicle to form an aqueous solution of impure boric acid;
b) separating pure crystalline boric acid from the aqueous solution of stage a) by crystallization;
c) treating the discharge liquor from the crystallization of stage b) firstly through a strong cation exchange resin and then through a weak anion exchange resin;
d) recycling the discharge liquor treated in stage c) for use as the aqueous vehicle for dissolving the impure boric acid in stage a).

9 Claims, No Drawings

METHOD FOR PRODUCING PURE BORIC ACID

This invention relates to a method for producing pure boric acid. Boric acid is a product widely used in industry. For example, it constitutes the raw material for the production of boric oxide, which is especially useful in the glass, ceramic and enamel sectors.

A certain number of chemical products are prepared from boric acid, such as inorganic borate salts, boron phosphate, fluoborates and boric esters, and also metal alloys such as ferro-boron alloys. Other uses derive from the bactericide and fungicide characteristics of boric acid. Finally, boric acid is used as a "safety" product in nuclear power plant because of its neutron capturing capacity.

Boric acid is mostly obtained from inorganic mineral borates (such as sodium borate and calcium borate) by treatment with aqueous sulphuric acid, after possible prior liquid/liquid extraction of the mineral. For this known method reference should be made to K.A.L.G. Watt, World Minerals and Metals, No. 22, British Sulphur Corporation Ltd. 1973, pages 5-12 and to the description of U.S. Pat. Nos. 2,969,275, 3,424,563, 3,479,294 and 3,493,349.

These methods produce an impure boric acid which requires purification to a greater or lesser degree according to the use for which it is intended. Generally, good purity boric acid is required, and at least when used as a "safety" product in nuclear power plant the boric acid must be of very high purity.

The treatment normally used for purifying boric acid consists of recrystallising it from aqueous solutions.

However, this method has problems because although on the one hand it enables the boric acid to be purified to the required degree, on the other hand it produces crystallisation discharge liquor which cannot be completely recycled as it is rich in impurities and is not suitable as a discharge effluent, both for pollution reasons and because of the loss of the residual boric acid contained in it.

There is therefore the need for a method for purifying impure boric acid by crystallisation from aqueous solutions which on the one hand enables the boric acid to be completely or substantially completely recovered in pure form, and on the other hand prevents or substantially prevents pollutant effluent discharge.

This requirement is satisfied by the method for purifying impure boric acid according to the present invention, which comprises the following stages carried out in succession:
  a) dissolving impure boric acid in an aqueous vehicle to form an aqueous solution of impure boric acid;
  b) separating pure crystalline boric acid from the aqueous solution of stage a) by crystallisation;
  c) treating the discharge liquor from the crystallisation of stage b) firstly through a strong cation exchange resin and then through a weak anion exchange resin;
  d) recycling the discharge liquor treated in stage c) for use as the aqueous vehicle for dissolving the impure boric acid in stage a).

The impure boric acid which is treated by the method of the present invention can have a purity of up to 99.9% by weight, e.g., from about 99% up to 99.9% by weight, and contains sulphate, magnesium, calcium and sodium ions as main impurities.

STAGE A)

According to the method of the present invention said impure boric acid is dissolved in an aqueous vehicle in the form of the discharge liquor from the acid recrystallisation stage after being treated through ion exchange resins in the manner described hereinafter. This crystallisation discharge liquor contains typically boric acid at a concentration of the order of 8% by weight and is free or substantially free of impurities. Typically, an aqueous solution with a total boric acid concentration of between 18% and 22% by weight is prepared, the operation being carried out at a temperature of between 88° and 92° C.

The aqueous impure boric acid solution prepared in this manner is conveniently filtered and then treated in stage b) of the method of the present invention.

STAGE B)

Boric acid is conveniently crystallised from the relative aqueous solution from stage a) in an adiabatic crystalliser operating under vacuum at a temperature less than the dissolution temperature in stage a), and typically of the order of 40° C. The suspension of crystalline boric acid in the relative discharge liquor obtained in this manner can then be thickened, and the thickened product is normally centrifuged to separate the boric acid.

STAGE C)

According to the method of the present invention, the discharge liquor from the crystallisation stage b) is treated in succession through a strong cation exchange resin and through a weak anion exchange resin.

Strong cation exchange resins suitable for this purpose are solid resins comprising sulphonic acid groups on a polystyrene matrix cross-linked with divinylbenzene, they being normally available commercially in the form of spherical particles of size between approximately 20 and approximately 50 mesh. Examples of commercially available strong cation exchange resins are: Amberlite IR-120 of the Rohm and Hass Co.; Duolite C-25 of the Chemical Process Co.; Dowex 50 of the Dow Chemical Co.; and Lewatit S100 of the Bayer Co.

Weak anion exchange resins suitable for this purpose are solid condensation products of a methylol compound with amines or copolymers of styrene with a cross-linking agent which have been chloromethylated and aminated with primary or secondary amine compounds. Examples of commercially available weak anion exchange resins are: Amberlite IR-4B, Amberlite IR-45, Amberlite IRA 94 S of the Rohm and Hass Co.; Duolite A-7 and Duolite A-14 of the Chemical Process Co.; and Dowex-3 of the Dow Chemical Co. These anion exchange resins are also available in nuclear or spherical form.

Conveniently the discharge liquor is firstly percolated through the strong cation resin and then through the weak anion resin, these being disposed in the form of a fixed bed in a long tubular apparatus, the operation being carried out at a temperature of the order of 45°-50° C. at a percolation rate of between 0.9 and 1.1 cm/sec.

This treatment eliminates or substantially eliminates impurities contained in the crystallisation discharge liquor but not the boric acid.

The ion exchange resins can be regenerated by the usual acid or base treatment methods.

STAGE D)

The crystallisation discharge liquor after purification in the aforesaid stage c) contains boric acid at a typical concentration of 8% by weight and is free or substantially free of impurities, and can therefore be recycled to stage a) to form the aqueous impure boric acid solution.

Using the method of the present invention, pure boric acid can be obtained. This means a boric acid having a purity exceeding 99.99% and an impurity content of less than 100 ppm. Moreover, the method of the present invention allows substantially complete boric acid recovery and obviates pollutant effluent discharge.

The experimental example given hereinafter illustrates the present invention but does not limit its scope.

EXAMPLE

Impure boric acid of 99.9% purity by weight is used containing iron, arsenic, calcium, magnesium, sodium, sulphate, chloride, phosphate and fluoride ions as impurities.

13 kg of this acid are dissolved in 100 kg of purified, recycled discharge liquor having a boric acid content of 8% by weight. The procedure is carried out at 90° C. to obtain an aqueous solution having a total boric acid content of 18.6% by weight. This solution is treated in an adiabatic crystalliser under vacuum, where the temperature falls to about 40° C. to cause crystallisation of boric acid.

The suspension obtained in this manner is thickened, and the thickened product is centrifuged to separate boric acid which is washed and dried.

In this manner 12.9 kg of boric acid are obtained (yield 99%) of purity exceeding 99.99% and with less than 100 ppm of impurities. The crystallisation discharge liquor is percolated firstly through a bed of strong cation resin, namely the commercial product LEWATIT S100 of the Bayer Co. (sulphonated polystyrene resin with a particle size of 0.3-1.25 mm and an overall ion exchange capacity of about 2.2 eq/l) and then through a bed of weak anion resin, namely the commercial product AMBERLITE IRA-94 S. of the Rohm and Hass Co. [high porosity pearl-like resin with a pearl size of 16-50 mesh (U.S. standard) and with an overall ion exchange capacity of 1.4 meq/ml).

Percolation is carried out with the resins disposed as a fixed bed in glass columns, the discharge liquor flowing from the bottom upwards, at a temperature of 50° C. and a percolation rate of 1 cm/sec.

Purified discharge liquor substantially free of impurities is obtained in this manner, and is recycled to the impure boric acid dissolving stage.

We claim:

1. A method for preparing boric acid having a purity exceeding 99.99% by weight by crystallization of impure boric acid of purity from about 99% up to 99.9% by weight and substantially eliminating effluent pollutant discharge, comprising:
   (a) dissolving the impure boric acid in an aqueous vehicle to form an aqueous solution of impure boric acid;
   (b) separating pure crystalline boric acid from the aqueous solution of step (a) by crystallization;
   (c) purifying the discharge liquor substantially depleted in boric acid from the crystallization step (b) through a strong cation exchange resin and then through a weak anion exchange resin; and
   (d) recycling the discharge liquor treated in step (c) for use as the aqueous vehicle for dissolving the impure boric acid in step (a).

2. The method according to claim 1, wherein the impure boric acid is of 99.9% purity by weight.

3. The method according to claim 1, wherein the dissolution step (a) is carried out at a temperature of between 88° and 92° C. and the aqueous solution contains between 18% and 22% of boric acid by weight.

4. The method according to claim 1, wherein the crystallization step (b) is carried out in an adiabatic crystallizer under vacuum at a temperature of about 40° C.

5. The method according to claim 1, wherein the strong cation exchange resin of step (c) is a polystyrene matrix cross-linked with divinylbenzene, carrying sulfonic acid groups.

6. The method according to claim 1, wherein the weak anion exchange resin of step (c) is a solid product resulting from condensation of a methylol compound with amines, or copolymers of styrene with a cross-linking agent which has been chloromethylated and aminated with primary or secondary amine compounds.

7. The method according to claim 1, wherein step (c) purification is carried out with the cation and anion exchange resins in the form of a fixed bed, at a crystallization discharge liquor percolation rate of between 0.9 and 1.1 cm/sec, and at a temperature of between 45° and 50° C.

8. The method according to claim 1, wherein the aqueous vehicle of step (a) contains about 8% boric acid by weight.

9. A method for preparing boric acid having a purity exceeding 99.99% by weight by crystallization of impure boric acid of 99.9% purity by weight and substantially eliminating effluent pollutant discharge, comprising:
   (a) dissolving boric acid of 99.9% purity by weight in an aqueous vehicle containing about 8% boric acid by weight to form an aqueous solution of impure boric acid having a boric acid concentration of between 18% to 22% by weight;
   (b) separating pure crystalline boric acid from the aqueous solution of step (a) by crystallization;
   (c) purifying the discharge liquor containing about 8% by weight of boric acid from the crystallization step (b) through a strong cation exchange resin and then through a weak anion exchange resin; and
   (d) recycling the discharge liquor treated in step (c) for use as the aqueous vehicle for dissolving the impure boric acid in step (a).

* * * * *